United States Patent
Tian

(10) Patent No.: US 11,394,212 B2
(45) Date of Patent: Jul. 19, 2022

(54) CHARGING METHOD, TERMINAL, AND COMPUTER STORAGE MEDIUM

(71) Applicant: GUANGDONG OPPO MOBILE TELECOMMUNICATIONS CORP., LTD., Guangdong (CN)

(72) Inventor: Chen Tian, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/631,063

(22) PCT Filed: Oct. 12, 2018

(86) PCT No.: PCT/CN2018/110026
§ 371 (c)(1),
(2) Date: Jan. 14, 2020

(87) PCT Pub. No.: WO2020/073311
PCT Pub. Date: Apr. 16, 2020

(65) Prior Publication Data
US 2021/0066932 A1    Mar. 4, 2021

(51) Int. Cl.
*H02J 7/00* (2006.01)

(52) U.S. Cl.
CPC ........ *H02J 7/0031* (2013.01); *H02J 7/00714* (2020.01); *H02J 7/007182* (2020.01); *H02J 2310/22* (2020.01)

(58) Field of Classification Search
None
See application file for complete search history.

(56) References Cited

U.S. PATENT DOCUMENTS

| | | | |
|---|---|---|---|
| 5,367,244 A | 11/1994 | Rose et al. | |
| 5,391,974 A * | 2/1995 | Shiojima | H02J 7/0091 320/150 |
| 5,451,880 A | 9/1995 | Yamagishi et al. | |
| 10,330,732 B2 * | 6/2019 | Roumi | G01R 31/389 |
| 2007/0188136 A1 | 8/2007 | Oh | |

(Continued)

FOREIGN PATENT DOCUMENTS

| | | |
|---|---|---|
| AU | 2011201443 A1 | 4/2011 |
| CN | 101192688 A | 6/2008 |

(Continued)

OTHER PUBLICATIONS

Japanese Office Action and English Translation for Application No. 2020-509504 dated Mar. 2, 2021.

(Continued)

*Primary Examiner* — Arun C Williams
(74) *Attorney, Agent, or Firm* — Young Basile Hanlon & MacFarlane, P.C.

(57) ABSTRACT

Embodiments of the present disclosure disclose a charging method, a terminal and a computer storage medium. The charging method includes: detecting a battery to obtain a battery charging parameter after turning on a fast charging function; determining whether an abnormal charging occurs according to the battery charging parameter; and turning off the fast charging function in response to determining that the abnormal charging occurs.

15 Claims, 3 Drawing Sheets

(56) References Cited

U.S. PATENT DOCUMENTS

| | | | |
|---|---|---|---|
| 2008/0238362 | A1 | 10/2008 | Pinnell et al. |
| 2011/0006733 | A1 | 1/2011 | Tatebayashi |
| 2011/0234170 | A1* | 9/2011 | Zhang .................. H02J 7/0016 320/134 |
| 2013/0181675 | A1* | 7/2013 | Kawasaki ............... B60L 58/20 320/109 |
| 2018/0062409 | A1 | 3/2018 | Jung et al. |
| 2018/0090977 | A1* | 3/2018 | Zhang ....................... H02J 7/02 |
| 2018/0183252 | A1 | 6/2018 | Kim et al. |
| 2018/0198161 | A1* | 7/2018 | Krasovitsky ............ H01M 4/04 |

FOREIGN PATENT DOCUMENTS

| | | |
|---|---|---|
| CN | 101937596 A | 1/2011 |
| CN | 106130089 A | 11/2016 |
| CN | 106170901 A | 11/2016 |
| CN | 205668502 U | 11/2016 |
| CN | 106849263 A | 6/2017 |
| CN | 108132401 A | 6/2018 |
| CN | 108599305 A | 9/2018 |
| EP | 3273570 A1 | 1/2018 |
| JP | H0515077 A | 1/1993 |
| JP | H0819192 A | 1/1996 |
| JP | 2010521949 A | 6/2010 |
| JP | 2012019606 A | 1/2012 |
| JP | 2014236584 A | 12/2014 |
| JP | 201708555 A | 6/2017 |
| JP | 2018512030 A | 4/2018 |
| KR | 20080053552 A | 6/2008 |
| KR | 20110134097 A | 12/2011 |
| KR | 20150084625 A | 7/2015 |

OTHER PUBLICATIONS

European Search Report for Application No. 18936517.4 dated Jan. 13, 2021.
Indian Office Action for Application No. 202017002961 dated Feb. 24, 2021.
International Search Report with English translation for PCT application PCT/CN2018/110026 dated Jul. 15, 2019.
Chinese Second Office Action with English Translation for CN Application 201880026950.8 dated Sep. 30, 2021. (12 pages).
Japanese Office Action with English Translation for JP Application 2020509504 dated Sep. 7, 2021. (10 pages).
Communication pursuant to Article 94(3) EPC for EP Application 18936517.4 dated Oct. 25, 2021. (8 pages).
Korean Office Action with English Translation for KR Application 10-2020-7004980 dated Jun. 10, 2021. (13 pages).
Korean Notice of Allowance with English Translation for KR Application 1020207004980 dated Mar. 2, 2022. (11 pages).
Korean Office Action with English Translation for KR Application 1020207004980 dated Dec. 23, 2021. (11 pages).
Japanese Notice of Reasons for Refusal with English Translation for JP Application 2020509504 dated Mar. 29, 2022. (8 pages).
Chinese Office Action with English Translation for CN Application 201880026950.8 dated May 10, 2022. (15 pages).
Communication pursuant to Article 94(3) EPC for EP Application 18936517.4 dated Apr. 25, 2022. (8 pages).

* cited by examiner

CHARGING METHOD, TERMINAL, AND COMPUTER STORAGE MEDIUM

CROSS-REFERENCE TO RELATED APPLICATION(S)

This application is a 371 application of International Application No. PCT/CN2018/110026, filed on Oct. 12, 2018, the entire disclosure of which is hereby incorporated by reference.

TECHNICAL FIELD

Embodiments of the present disclosure relate to a charging technology in a field of terminals, and more particularly, to a charging method, a terminal and a computer storage medium.

BACKGROUND

After a terminal establishes bidirectional communication with an adapter, the adapter charges a battery of the terminal in a multi-stage constant current mode, so that fast charging may be realized. However, in the process of fast charging, when an abnormal leakage path exists in the adapter or the terminal, the current entering the battery is reduced, and even a discharging may occur, leading to serious consequences. Therefore, it is very important for the terminal to monitor abnormal charging situations during fast charging.

SUMMARY

Embodiments of the present disclosure provide a charging method. The method includes:
detecting a battery to obtain a battery charging parameter after turning on a fast charging function;
determining whether an abnormal charging occurs according to the battery charging parameter; and
turning off the fast charging function in response to determining that the abnormal charging occurs.

Embodiments of the present disclosure provide a terminal. The terminal includes a processor and a memory storing an instruction executable by the processor. When the instruction is executed by the processor, the charging method as described above is implemented.

Embodiments of the present disclosure provide a computer readable storage medium having a program stored thereon and applied to a terminal. When the program is executed by a processor, the charging method as described above is implemented.

DETAILED DESCRIPTION

Technical solutions in embodiments of the present disclosure will be described clearly and completely with reference to accompanying drawings. It should be understood that, the specific embodiments described herein are only used to explain the present disclosure rather than to limit the present disclosure. In addition, it should also be noted that, for convenience of description, only parts related to the present disclosure are illustrated in the accompanying drawings.

When fast charging is performed on the terminal, the super-fast charging function needs to be realized through a customized adapter and battery. Generally, a microcontroller unit (MCU) intelligent chip is configured in the adapter for super-fast charging, so that the adapter is an upgradable intelligent charger.

Figure 1:
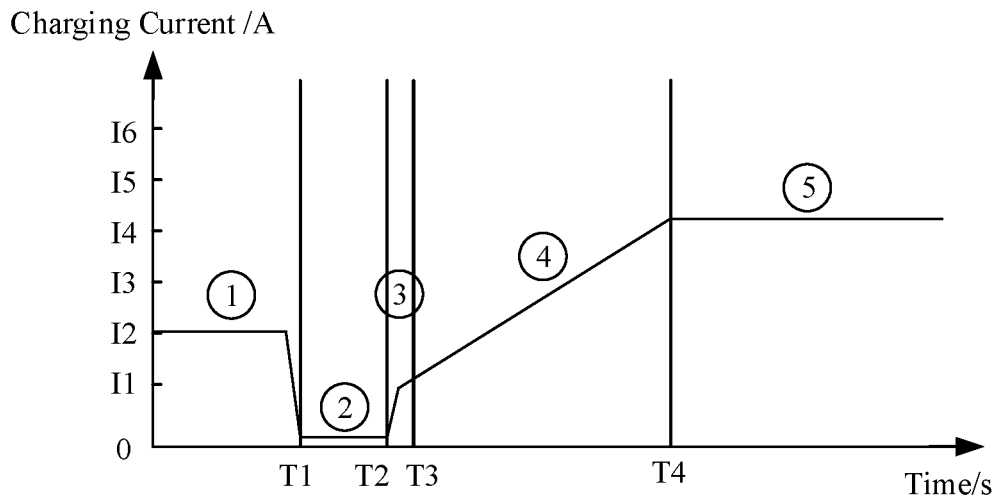
FIG. 1 is a schematic diagram of a fast charging communication process according to an embodiment of the present disclosure.

Further, in an embodiment of the present disclosure, as illustrated in FIG. 1, which is a schematic diagram of a fast charging communication process according to an embodiment of the present disclosure, the process of performing fast charging on the terminal by the adapter mainly includes the following five stages.

Stage 1: the terminal detects a type of the adapter. The adapter starts handshake communication between the adapter and the terminal, and sends an instruction to inquire whether the terminal agrees to start a fast charging mode. After the terminal agrees to start the fast charging, the fast charging communication process enters Stage 2.

The terminal may detect the type of the adapter through D+ and D− wires. When the adapter is detected to be a charging device which does not perform the charging via a universal serial bus (USB), the current absorbed by the terminal may be greater than a preset current value I2. When the adapter detects that an output current of the adapter within a preset time period is greater than or equal to I2, the adapter considers that the terminal has finished identifying the type of the adapter. Then, the adapter starts handshake communication between the adapter and the terminal, and the adapter sends an instruction to inquire whether the terminal agrees to start the fast charging mode. When the adapter receives a reply instruction from the terminal indicating that the terminal does not agree to start the fast charging mode, the output current of the adapter is detected again. When the output current of the adapter is still greater than or equal to I2, the request is initiated again to inquire whether the terminal agrees to start the fast charging mode, and steps in Stage 1 are repeated until the terminal agrees to start the fast charging mode in reply, or until the output current of the adapter is no longer greater than or equal to I2.

Stage 2: the adapter sends another instruction to the terminal to inquire whether the output voltage of the adapter is suitable. After the terminal replies to the adapter that the output voltage is high, low or suitable, the adapter adjusts the output voltage until the output voltage is suitable.

The voltage output by the adapter may include several levels. The adapter may send an instruction to the terminal to inquire whether the output voltage of the adapter is suitable for being used as the charging voltage in the fast charging mode or not. When the adapter receives feedback from terminal that the output voltage of the adapter is high or low, the adapter adjusts the output voltage of the adapter by one level, and sends an instruction to the terminal again to inquire the terminal whether the output voltage of the adapter of is suitable or not.

Stage 3: the adapter sends a further instruction to the terminal to inquiring a maximum charging current presently supported by the terminal, and the terminal replies to the adapter the maximum charging current, and then the process enters Stage 4.

Stage 4: the adapter may set the output current to the maximum charging current currently supported by the terminal, and enters a constant current stage, i.e. Stage 5.

Stage 5: when entering the constant current stage, the adapter may send another instruction at intervals to inquire about the present voltage of a battery in the terminal. The terminal may feed back the present voltage of the battery in the terminal to the adapter. The adapter may determine whether contact is good and whether the present charging current value of the terminal needs to be lowered according to the feedback of the terminal about the present voltage of the battery in the terminal.

It should be noted that the constant current stage does not mean that the output current of the adapter is kept constant in Stage 5. The constant current refers to a multi-stage constant current, that is, the current is kept constant for a period of time.

Since the fast charging is realized by establishing bidirectional communication between the adapter and the terminal to perform the multi-stage constant current charging on the terminal, in order to ensure the safety and the reliability of the fast charging, it is particularly important to monitor abnormal charging conditions when the fast charging is performed on the terminal.

The technical solutions in embodiments of the present disclosure will be clearly and completely described below with reference to the drawings in embodiments of the present disclosure.

Figure 2:
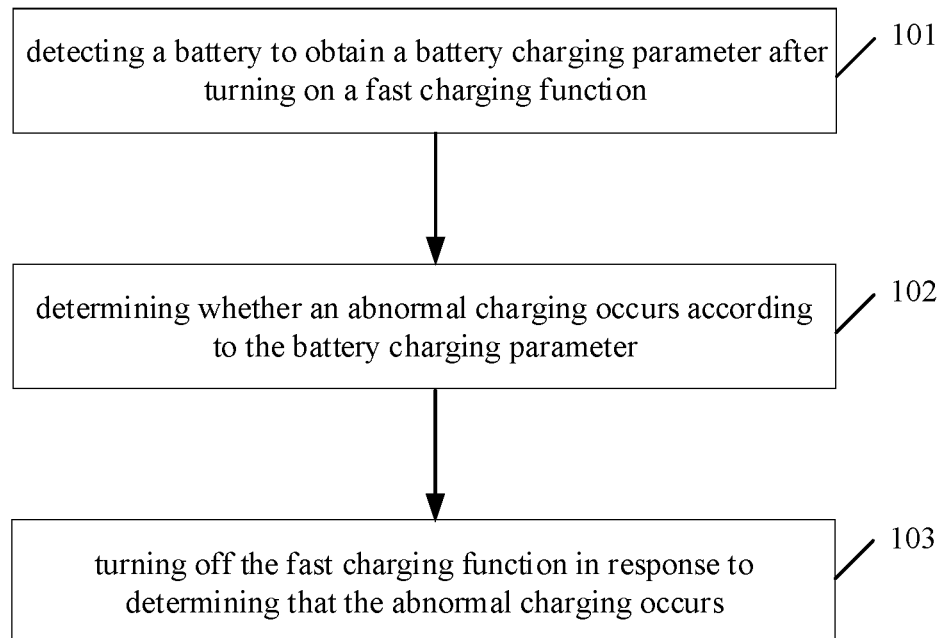
FIG. 2 is a schematic flow chart of an implementation of a charging method according to an embodiment of the present disclosure.

An embodiment of the present disclosure provides a charging method. FIG. 2 is a schematic flow chart of an implementation of a charging method according to an embodiment of the present disclosure. As illustrated in FIG. 2, in an embodiment of the present disclosure, the method for charging the terminal may include the followings.

At block 101, a battery is detected to obtain a battery charging parameter after a fast charging function is turned on.

In an embodiment of the present disclosure, after establishing connection with the adapter and turning on the fast charging function, the terminal may detect the battery, so that the battery charging parameter may be obtained.

Further, in an embodiment of the present disclosure, the terminal is a device to be charged that may be connected to the adapter. The terminal may be any terminal having communication and storage functions, for example, a terminal such as a tablet computer, a mobile phone, an electronic reader, a remote controller, a personal computer (PC), a notebook computer, a vehicle-mounted device, a network television and a wearable device.

It should be noted that, in an embodiment of the present disclosure, the terminal may perform the fast charging function through connection and communication with the adapter.

It should be noted that in embodiments of the present disclosure, after the terminal establishes a connection with the adapter, the adapter may send a clock signal to the terminal through a data wire in an USB interface. The clock signal is configured to indicate a communication sequence between the adapter and the terminal. In detail, the adapter actively transmits the clock signal to the terminal, and the adapter may maintain the transmission of the clock signal throughout the connection with the terminal, so that bidirectional communication with the terminal may be performed under the control of the communication sequence.

Further, in embodiments of the present disclosure, the communication sequence includes an instruction transmission period of the adapter and an instruction reception period of the adapter, which are alternately generated.

Further, in an embodiment of the present disclosure, the adapter may be configured to perform fast charging on the terminal. In detail, the adapter and the terminal may be connected through the universal serial bus (USB) interface. The USB interface may be a common USB interface, a micro USB interface or a Type-C interface. The power line in the USB interface is arranged in the adapter to charge the terminal. The power wire in the USB interface may be a VBus wire and/or a ground wire in the USB interface. The data wire in the USB interface is arranged in the adapter for bidirectional communication with the terminal. The data wire may be the D+ wire and/or the D− wire in the USB interface. The bidirectional communication may refer to an information interaction between the adapter and the terminal.

Further, in embodiments of the present disclosure, the adapter may support a normal charging mode and a fast charging mode. A charging current in the fast charging mode is greater than a charging current in the normal charging mode, that is, a charging speed of the fast charging mode is faster than a charging speed of the normal charging mode. In general, the normal charging mode may be understood as a charging mode with a rated output voltage of 5V and a rated output current of 2.5 A or less. In addition, in the normal charging mode, output ports D+ and D− of the power adapter may be short-circuited, while in the fast charging mode, the power adapter may communicate and exchange data with a mobile terminal by using the output ports D+ and D−.

Further, in an embodiment of the present disclosure, after the terminal establishes a connection with the adapter and turns on the fast charging function, the terminal may first detect the battery, so as to obtain the battery charging parameter.

It should be noted that, in embodiments of the present disclosure, the battery charging parameter may represent a battery state of the terminal during the fast charging.

Further, in embodiments of the present disclosure, the battery charging parameter may include a voltage variation parameter, an electric quantity variation parameter, a real-time battery current, and the like of the battery. When the terminal is in the fast charging, the voltage variation, the electric quantity variation and the real-time current corresponding to the battery have certain regularity, so that the terminal may detect the battery charging parameters such as the voltage variation parameter, the electric quantity variation parameter and the real-time battery current.

It should be noted that, in embodiments of the present disclosure, after the terminal detects and obtains the battery charging parameter, the terminal may further determine whether there is an abnormal charging according to the battery charging parameter.

At block 102, it is determined whether an abnormal charging occurs according to the battery charging parameter.

In an embodiment of the present disclosure, after the terminal detects the battery and obtains the battery charging parameter, the terminal may further determine whether the abnormal charging occurs according to the battery charging parameter.

Further, in embodiments of the present disclosure, after the terminal detects and obtains the battery charging parameter, the terminal may monitor the fast charging process of the terminal according to the battery charging parameter, so that it is possible to further determine whether the abnormal charging exists.

It should be noted that, in embodiments of the present disclosure, when the terminal performs the fast charging, the terminal may determine that the abnormal charging occurs if the battery charging parameter does not meet a typical fast charging rule of the battery. For example, in a case where the battery charging parameter is the real-time current, the terminal may consider that there is a leakage problem, that is, the abnormal charging occurs, if the real-time current is negative, i.e., if the battery is in a discharging state.

Further, in embodiments of the present disclosure, when determining whether the abnormal charging exists, the terminal may determine the abnormal charging according to one charging parameter, or may determine the abnormal charging with reference to different charging parameters.

At block 103, the fast charging function is turned off in response to determining that the abnormal charging occurs.

In an embodiment of the present disclosure, after the terminal determines whether the abnormal charging occurs according to the battery charging parameter, the terminal may turn off the fast charging function in response to determining that the abnormal charging occurs.

Further, in an embodiment of the present disclosure, after the terminal determines whether the abnormal charging exists according to the battery charging parameter, the terminal may start a preset protection mode for protecting the charging safety of the terminal in response to determining that the abnormal charging exists.

It should be noted that, in embodiments of the present disclosure, the preset protection mode may be configured to handle the abnormal charging. In detail, the preset protection mode may refer to turning off the fast charging function and terminating the fast charging.

Further, in embodiments of the present disclosure, after the terminal determines whether the abnormal charging occurs according to the battery charging parameter, that is, after the block 102, the method for charging the terminal may further include the followings.

At block 104, a disconnection instruction is sent in response to determining that the abnormal charging occurs.

In embodiments of the present disclosure, after determining whether the abnormal charging occurs according to the battery charging parameter, the terminal may send the disconnection instruction in response to determining that the abnormal charging occurs.

It should be noted that, in embodiments of the present disclosure, when it is determined that the abnormal charging occurs, the terminal considers that disconnection from the adapter is necessary, and thus the terminal may send the disconnection instruction to the adapter.

At block 105, a disconnection response for responding to the disconnection instruction is received, and the connection is disconnected.

In an embodiment of the present disclosure, after sending the disconnection instruction, the terminal may receive the disconnection response for responding to the disconnection instruction, and disconnect the connection.

Further, in an embodiment of the present disclosure, after the terminal first transmits the disconnection instruction to the adapter, the terminal may receive the disconnection response transmitted by the adapter and for responding to the disconnection instruction, and may then disconnect the connection with the adapter.

According to the charging method provided by embodiments of the present disclosure, the terminal detects the battery to obtain the battery charging parameter after turning on the fast charging function; determines whether an abnormal charging occurs according to the battery charging parameter; and turns off the fast charging function in response to determining that the abnormal charging occurs. Consequently, in embodiments of the present disclosure, the terminal may detect the charging state of the battery after performing fast charging, to obtain the battery charging parameter, so that the terminal may determine whether there is an abnormal charging according to the battery charging parameter. In detail, since the battery charging parameter may satisfy certain rules when fast charging is performed on the terminal, the terminal may determine the fast charging state according to the battery charging parameter after determining the battery charging parameter, so that the terminal may monitor the abnormal charging during the fast charging, and may terminate the fast charging in time once monitoring that there exists the abnormal charging, thereby effectively improving the safety and intelligence of the terminal.

According to the foregoing embodiments, in yet another embodiment of the present disclosure, detecting, by the terminal, the battery to obtain the battery charging parameter may include the following situations.

In an embodiment of the present disclosure, further, the method for detecting the battery by the terminal to obtain the battery charging parameter may include the following steps.

In step 101*a*, the voltage of the battery is detected at a first preset time interval to obtain the voltage variation parameter.

In an embodiment of the present disclosure, after the terminal establishes a connection with the adapter and turns on the fast charging function, the terminal may first perform a battery voltage detection according to the first preset time interval, so that the voltage variation parameter may be obtained.

It should be noted that, in an embodiment of the present disclosure, when the terminal performs the fast charging, the terminal may perform a voltage detection on the battery according to the first preset time interval to obtain real-time voltages of the battery at different time points, and then may obtain the voltage variation parameter according to the real-time voltages of the battery at different time points.

Further, in an embodiment of the present disclosure, the terminal may preset a time interval, i.e., the first preset time interval. The first preset time interval may be configured to control monitoring of a change rule of the electric quantity of the battery.

It should be noted that, in embodiments of the present disclosure, the terminal may set the first preset time interval through various methods. For example, the terminal may set the first preset time interval through receiving a selection operation of a user, and the terminal may also set the first preset time interval according to a performance parameter of the battery.

In step 101*b*, the voltage variation parameter is determined as the battery charging parameter.

In an embodiment of the present disclosure, after the terminal performs the battery voltage detection according to the first preset time interval to obtain the voltage variation parameter, the voltage variation parameter may be determined as the battery charging parameter.

It should be noted that, in an embodiment of the present disclosure, when the fast charging is performed on the terminal and the voltage variation of the battery conforms to a certain rule, the terminal may obtain the charging state of the battery according to the voltage variation parameter, so that the voltage variation parameter of the battery may be used as the battery charging parameter.

Further, in an embodiment of the present disclosure, the method for detecting the battery by the terminal to obtain the battery charging parameter may include the following steps.

In step 101c, the electric quantity of the battery is detected at a second preset time interval to obtain the electric quantity variation parameter.

In an embodiment of the present disclosure, after the terminal establishes a connection with the adapter and turns on the fast charging function, the terminal may first perform the battery electric quantity detection according to the second preset time interval, so that the electric quantity variation parameter may be obtained.

It should be noted that, in embodiments of the present disclosure, when performing the fast charging, the terminal may perform an electric quantity detection on the battery according to the second preset time interval to obtain real-time electric quantities of the battery at different time points, and then may obtain the electric quantity variation parameter according to the real-time electric quantities of the battery at different time points.

Further, in an embodiment of the present disclosure, the terminal may preset a time interval, i.e., the second preset time interval. The second preset time interval may be configured to control monitoring of the change rule of the electric quantity of the battery.

It should be noted that, in embodiments of the present disclosure, the terminal may set the second preset time interval through various methods. For example, the terminal may set the second preset time interval through receiving the selection operation of the user, and the terminal may also set the second preset time interval according to the performance parameter of the battery.

Further, in an embodiment of the present disclosure, the first preset time interval and the second preset time interval are configured to detect the voltage variation parameter and the electric quantity variation parameter, respectively. Since the voltage of the battery varies fast and the electric quantity of the battery varies slowly, the first preset time interval may be greater than or equal to the second preset time interval.

Figure 3:
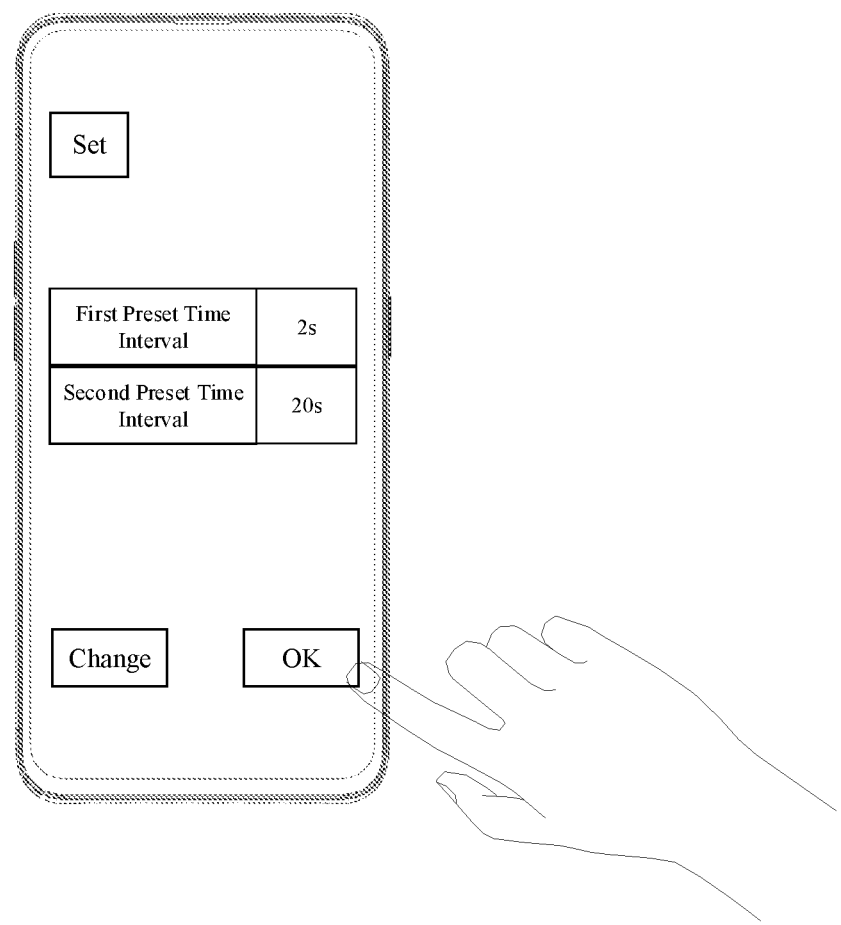
FIG. 3 is a schematic diagram of setting time intervals according to an embodiment of the present disclosure.

FIG. 3 is a schematic diagram of setting time intervals according to an embodiment of the present disclosure. As illustrated in FIG. 3, in an embodiment of the present disclosure, the terminal may receive an input operation and a selection operation of a user. The first preset time interval is set to be 2 s, and the second preset time interval is set to be 20 s.

In step 101d, the electric quantity variation parameter is determined as the battery charging parameter.

In an embodiment of the present disclosure, after the terminal detects the electric quantity of the battery according to the second preset time interval and obtains the electric quantity variation parameter, the electric quantity variation parameter may be determined as the battery charging parameter.

It should be noted that, in an embodiment of the present disclosure, when the fast charging is performed on the terminal, the change of the electric quantity of the battery conforms to a certain rule. For example, as the charging time increases, the electric quantity of the battery also increases continuously. Therefore, the terminal may obtain the charging state of the battery according to the electric quantity variation parameter, that is, the electric quantity variation parameter of the battery may be used as the battery charging parameter.

In an embodiment of the present disclosure, further, the method for detecting the battery by the terminal to obtain the battery charging parameter may include the following steps.

In step 101e, the battery current is detected in real time to obtain the real-time battery current.

In an embodiment of the present disclosure, after the terminal establishes connection with the adapter and turns on the fast charging function, the terminal may perform the real-time current detection on the battery first, so that the real-time battery current may be obtained.

It should be noted that, in an embodiment of the present disclosure, when the terminal performs the real-time current detection on the battery, a current flowing into the battery may be set to be positive and a current flowing out of the battery may be set to be negative. For example, when a current of 5 A flowing into the battery is detected, the real-time battery current may be determined to be 5 A, and when a current of 2 A flowing out of the battery is detected, the real-time battery current may be determined to be −2 A.

In step 101f, the real-time battery current is determined as the battery charging parameter.

In an embodiment of the present disclosure, after the terminal performs the real-time current detection on the battery and obtains the real-time battery current, the terminal may determine the real-time battery current as the battery charging parameter.

It should be noted that, in an embodiment of the present disclosure, when the fast charging is performed on the terminal, the real-time battery current conforms to a certain rule. For example, during the charging process, the real-time battery current should be positive, rather than negative, that is, during the charging process, the current flows into the battery and does not flow out of the battery. Consequently, the terminal may obtain the charging state of the battery according to the real-time battery current, that is, the real-time battery current may be used as the battery charging parameter.

Further, in an embodiment of the present disclosure, the battery charging parameter may be other battery parameters besides the voltage variation parameter, the electric quantity variation parameter and the real-time battery current, which is not particularly limited in the present disclosure.

According to the charging method provided by embodiments of the present disclosure, the terminal detects the battery to obtain the battery charging parameter after turning on the fast charging function; determines whether an abnormal charging occurs according to the battery charging parameter; and turns off the fast charging function in response to determining that the abnormal charging occurs. Consequently, in embodiments of the present disclosure, the terminal may detect the charging state of the battery after performing fast charging, to obtain the battery charging parameter, so that the terminal may determine whether there is an abnormal charging according to the battery charging parameter. In detail, since the battery charging parameter may satisfy certain rules when fast charging is performed on the terminal, the terminal may determine the fast charging state according to the battery charging parameter after determining the battery charging parameter, so that the terminal may monitor the abnormal charging during the fast charging, and may terminate the fast charging in time once monitoring that there exists the abnormal charging, thereby effectively improving the safety and intelligence of the terminal.

Based on the foregoing embodiments, in another embodiment of the present disclosure, the method for the terminal to determine whether the abnormal charging occurs according to the battery charging parameter may include the following steps.

In step 102a, it is determined that the abnormal charging occurs if the battery charging parameter is negative.

In an embodiment of the present disclosure, after the terminal detects the battery and obtains the battery charging parameter, it may be determined that the abnormal charging occurs if the battery charging parameter is negative.

Further, in the implementation of the present disclosure, after the terminal detects the current of the battery in real time and obtains the real-time battery current, the battery may be considered to be in a discharging state if the real-time battery current is negative, and thus it may be determined that the abnormal charging exists.

It should be noted that in an embodiment of the present disclosure, when the terminal detects that the real-time battery current is negative, it may indicate that a leakage path, which causes the battery to be in the discharging state, exists in the terminal or the adapter, that is, the terminal has the abnormal charging.

In step 102b, it is determined that the abnormal charging does not occur if the battery charging parameter is not negative.

In an embodiment of the present disclosure, after the terminal detects the battery and obtains the battery charging parameter, it may be determined that the abnormal charging does not occur if the battery charging parameter is not negative.

Further, in the implementation of the present disclosure, after the terminal detects the current of the battery in real time and obtains the real-time battery current, if the real-time battery current is not negative, the terminal may consider that the battery is not in the discharging state, and thus it may be determined that the abnormal charging does not exist.

It should be noted that, in an embodiment of the present disclosure, when the real-time battery current detected and obtained by the terminal is positive, the battery may be considered to be in a charging state, and therefore it may be determined that the fast charging process is normal; and when the real-time battery current detected by the terminal is zero, it may be considered that the charging on the terminal is finished, and therefore, it may be determined that the abnormal charging does not exist.

Further, in an embodiment of the present disclosure, the method for the terminal to determine whether the abnormal charging occurs according to the battery charging parameter may include the following steps.

In step 102c, it is determined that the abnormal charging occurs if the battery charging parameter does not satisfy a preset parameter variation strategy.

In an embodiment of the present disclosure, after the terminal detects the battery and obtains the battery charging parameter, the terminal may determine that the abnormal charging occurs if the battery charging parameter does not satisfy the preset parameter variation strategy.

Further, in an implementation of the present disclosure, after the terminal performs a voltage variation detection or an electric quantity variation detection on the battery to obtain the voltage variation parameter or the electric quantity variation parameter, it may be determined that the battery has the abnormal charging if the voltage variation parameter or the electric quantity variation parameter does not satisfy the preset parameter variation strategy.

It should be noted that, in an embodiment of the present disclosure, when the fast charging is performed on the terminal, both the voltage variation and the electric quantity variation of the battery meet a certain rule. Consequently, the terminal may set the preset parameter variation strategy in advance, in which the preset parameter variation strategy may be configured to determine whether the variation of the battery charging parameter is normal.

Further, in an embodiment of the present disclosure, different preset parameter variation strategies correspond to different charging parameters of the battery. For example, for the variation of the electric quantity of the battery, the preset parameter variation strategy may be that the electric quantity is continuously increased, and for the variation of the voltage of the battery, the preset parameter variation strategy may be divided into obeying different variation rules according to different fast charging stages.

In step 102d, it is determined that the abnormal charging does not occur if the battery charging parameter satisfies the preset parameter variation strategy.

In an embodiment of the present disclosure, after the terminal detects the battery and obtains the battery charging parameter, the terminal may determine that the abnormal charging does not occur if the battery charging parameter satisfies the preset parameter variation strategy.

Further, in an implementation of the present disclosure, after the terminal performs the voltage variation detection or the electric quantity variation detection on the battery to obtain the voltage variation parameter or the electric quantity variation parameter, it may be determined that the abnormal charging does not exist in the battery if the voltage variation parameter or the electric quantity variation parameter satisfies the preset parameter variation strategy.

It should be noted that in an embodiment of the present disclosure, when determining the abnormal charging according to the battery charging parameter and the preset parameter variation strategy, the terminal may determine according to a certain battery charging parameter, or may determine in combination with different battery charging parameters. For example, the terminal may determine whether the abnormal charging exists only according to the electric quantity variation parameter.

According to the charging method provided by embodiments of the present disclosure, the terminal detects the battery to obtain the battery charging parameter after turning on the fast charging function; determines whether an abnormal charging occurs according to the battery charging parameter; and turns off the fast charging function in response to determining that the abnormal charging occurs. Consequently, in embodiments of the present disclosure, the terminal may detect the charging state of the battery after performing fast charging, to obtain the battery charging parameter, so that the terminal may determine whether there is an abnormal charging according to the battery charging parameter. In detail, since the battery charging parameter may satisfy certain rules when fast charging is performed on the terminal, the terminal may determine the fast charging state according to the battery charging parameter after determining the battery charging parameter, so that the terminal may monitor the abnormal charging during the fast charging, and may terminate the fast charging in time once monitoring that there exists the abnormal charging, thereby effectively improving the safety and intelligence of the terminal.

Figure 4:
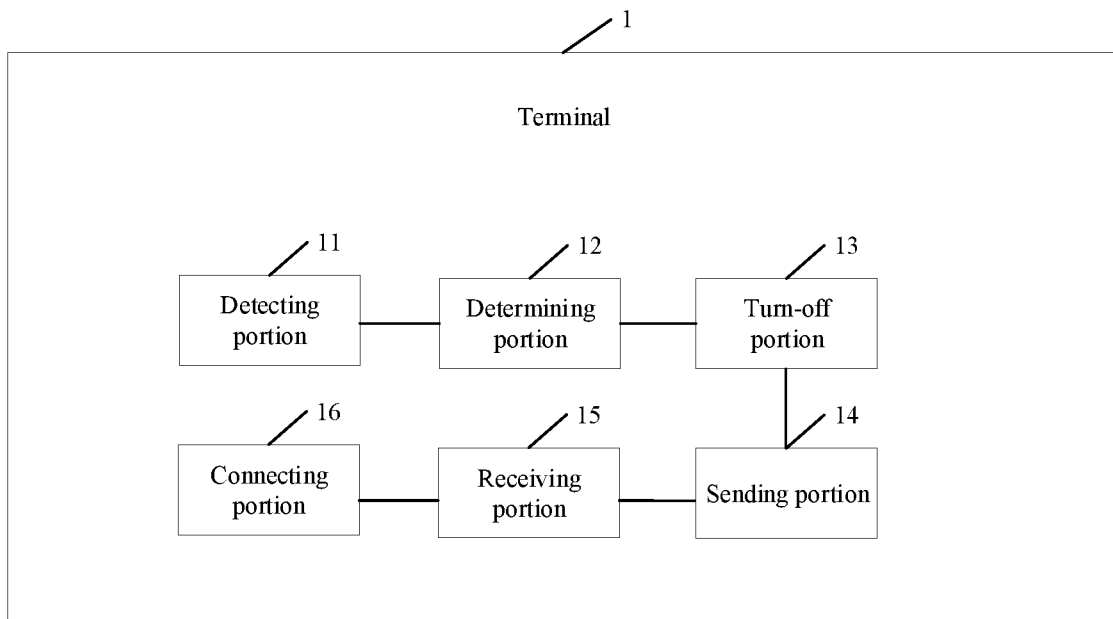
FIG. 4 is a schematic diagram of a structure of a terminal according to an embodiment of the present disclosure.

Based on the foregoing embodiments, in another embodiment of the present disclosure, as illustrated in FIG. 4, which is a schematic diagram of a structure of a terminal according to an embodiment of the present disclosure, a terminal 1 according to the embodiment of the present disclosure may include a detecting portion 11, a determining portion 12, a turn-off portion 13, a sending portion 14, a receiving portion 15, and a connecting portion 16.

The detecting portion 11 is configured to detect the battery to obtain the battery charging parameter after turning on the fast charging function.

The determining portion 12 is configured to determine whether the abnormal charging occurs according to the battery charging parameter.

The turn-off portion 13 is configured to turn off the fast charging function in response to determining that the abnormal charging occurs.

Further, in an embodiment of the present disclosure, the detecting portion 11 is specifically configured to detect the voltage of the battery at the first preset time interval to obtain the voltage variation parameter, and to determine the voltage variation parameter as the battery charging parameter; to detect an electric quantity of the battery at the second preset time interval to obtain the electric quantity variation parameter, and to determine the electric quantity variation parameter as the battery charging parameter; and to detect the current of the battery in real time to obtain the real-time battery current, and to determine the real-time battery current as the battery charging parameter.

Further, in an embodiment of the present disclosure, the determining portion 12 is specifically configured to determine that the abnormal charging occurs if the battery charging parameter is negative, and determine that the abnormal charging does not occur if the battery charging parameter is not negative.

Further, in an embodiment of the present disclosure, the determining portion 12 is further specifically configured to determine that the abnormal charging occurs if the battery charging parameter does not satisfy the preset parameter variation strategy, and determine that the abnormal charging does not occur if the battery charging parameter satisfies the preset parameter variation strategy.

Further, in an embodiment of the present disclosure, the sending portion 14 is configured to send the disconnection instruction in response to determining that the abnormal charging occurs after determining whether the abnormal charging occurs according to the battery charging parameter.

The receiving portion 15 is configured to receive the disconnection response for responding to the disconnection instruction.

The connecting portion 16 is configured to disconnect the connection after receiving the disconnection response for responding to the disconnection instruction.

Figure 5:
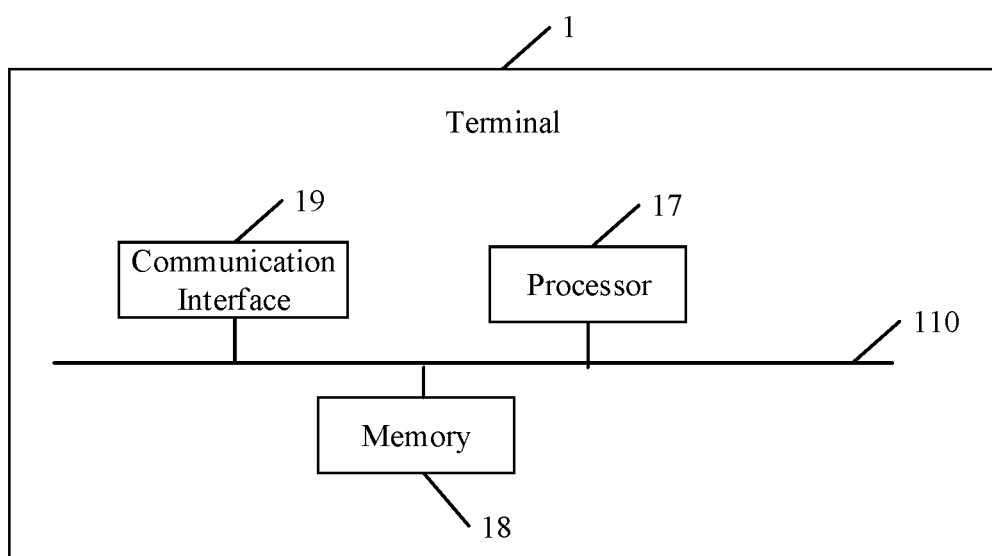
FIG. 5 is another schematic diagram of a structure of a terminal according to an embodiment of the present disclosure.

FIG. 5 is another schematic diagram of a structure of a terminal according to an embodiment of the present disclosure. As illustrated in FIG. 5, the terminal 1 according to the embodiment of the present disclosure may include a processor 17, a memory 18 storing instructions executable by the processor 17. Further, the terminal 1 may further include a communication interface 19, and a bus 110 for connecting the processor 17, the memory 18, and the communication interface 19.

In an embodiment of the present disclosure, the processor 17 may be at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller and a microprocessor. It is to be understood that, for different devices, an electronic device for implementing the above-mentioned functions of the processor may be of other types and is not specifically limited in the embodiment of the present disclosure. The memory 18 is configured to store executable program codes, including computer operation instructions. The memory 18 may include a high-speed RAM memory, and may also include a non-volatile memory, such as at least two disk memories.

In an embodiment of the present disclosure, the bus 110 is configured to connect the communication interface 19, the processor 17 and the memory 18, as well as for intercommunication between these devices.

In an embodiment of the present disclosure, the memory 18 is configured to store instructions and data.

Further, in an embodiment of the present disclosure, the processor 17 is configured to: detect the battery to obtain the battery charging parameter after turning on the fast charging function; determine whether the abnormal charging occurs according to the battery charging parameter; and turn off the fast charging function in response to determining that the abnormal charging occurs.

In practical applications, the memory may be a volatile memory, such as a random access memory (RAM); a non-volatile memory, such as a read-only memory (ROM), a flash memory, a hard disk drive (HDD) or a solid-state drive (SSD); or a combination of the above memories, and is configured to provide instructions and data to the processor.

In addition, individual functional modules in the embodiments of the present disclosure may be integrated in one processing unit or may be separately physically present, or two or more units may be integrated in one unit. The integrated unit as described above may be achieved in the form of hardware, or may be achieved in the form of a software functional module.

If the integrated module is achieved in the form of a software functional module and is not sold or used as a separate product, the integrated unit may also be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) or a processor to execute all or part of steps in the methods described in respective embodiments of the present disclosure. The above storage medium may be any medium capable of storing program codes, including a USB flash disk, a mobile hard disk, a read-only memory (ROM), a random access memory (RAM), a disc, or a light disk.

Embodiments of the present disclosure provide a terminal. The terminal detects the battery to obtain the battery charging parameter after turning on the fast charging function; determines whether the abnormal charging occurs according to the battery charging parameter; and turns off the fast charging function in response to determining that the abnormal charging occurs. Consequently, in embodiments of the present disclosure, the terminal may detect the charging state of the battery after performing fast charging, to obtain the battery charging parameter, so that the terminal may determine whether there is an abnormal charging according to the battery charging parameter. In detail, since the battery charging parameter may satisfy certain rules when the fast charging is performed on the terminal, the terminal may determine the fast charging state according to the battery charging parameter after determining the battery charging parameter, so that the terminal may monitor the abnormal charging during the fast charging, and may terminate the fast charging in time once monitoring that there exists the abnormal charging, thereby effectively improving the safety and intelligence of the terminal.

Embodiment of the present disclosure provide a computer readable storage medium having a program stored thereon. When the program is executed by a processor, the charging method as described above is implemented.

In detail, the program instruction corresponding to the charging method in the embodiment may be stored on a storage medium such as an optical disk, a hard disk, a USB disk, or the like. When the program instruction corresponding to the charging method in the storage medium is read or executed by an electronic device, the following steps are included:

detecting the battery to obtain the battery charging parameter after turning on the fast charging function;
determining whether the abnormal charging occurs according to the battery charging parameter; and
turning off the fast charging function in response to determining that the abnormal charging occurs.

Those skilled in the art will appreciate that embodiments of the present disclosure may be provided as a method, a system, or a computer program product. Accordingly, the present disclosure may take the form of a hardware embodiment, a software embodiment, or an embodiment in combination with software and hardware. Moreover, the present disclosure may take the form of the computer program product that is embodied on one or more computer-usable storage media (including but not limited to disk memories and optical memories, etc.) including computer-usable program codes.

The present disclosure is described with reference to implementation flow charts and/or block diagrams of a method, a device (a system) and a computer program product according to embodiments of the present disclosure. It may be understood that each flow and/or block in a flow chart and/or a block diagram, and a combination of a flow and/or a block in a flow chart and/or a block diagram may be implemented by computer program instructions. The computer program instructions may be provided to a processor in a general purpose computer, a special purpose computer, an embedded processor, or other programmable data processing devices to produce a machine, so that instructions executed by a processor in a computer or other programmable data processing devices generate a means configured to implement functions specified in one or more flows in a flow chart and/or one or more blocks in a block diagram.

The computer program instructions may also be stored in a computer readable memory that may instruct a computer or other programmable data processing devices to operate in a particular manner, such that the instructions stored in the computer readable memory produce a manufactured product including an instruction device. The device implements functions specified in one or more flows in a flow chart and/or one or more blocks in a block diagram.

These computer program instructions may also be loaded onto a computer or other programmable data processing devices such that a series of operational steps are performed on a computer or other programmable devices to produce processing implemented by the computer. Consequently, instructions executed on the computer or other programmable devices provide steps for implementing the functions specified in one or more flows in a flow chart and/or one or more blocks in a block diagram.

The above embodiments are only preferred embodiments of the present disclosure and are not intended to limit the scope of the present disclosure.

INDUSTRIAL APPLICABILITY

Embodiments of the present disclosure provide a charging method, a terminal and a computer storage medium. The terminal detects a battery to obtain a battery charging parameter after turning on a fast charging function; determines whether an abnormal charging occurs according to the battery charging parameter; and turns off the fast charging function in response to determining that there exists the abnormal charging. Consequently, in embodiments of the present disclosure, the terminal may detect a charging state of the battery after performing fast charging to obtain the battery charging parameter, so that the terminal may determine whether there is an abnormal charging according to the battery charging parameter. In detail, since the battery charging parameter may satisfy certain rules when fast charging is performed on the terminal, the terminal may determine the fast charging state according to the battery charging parameter after determining the battery charging parameter, so that the terminal may monitor the abnormal charging during the fast charging, and may terminate the fast charging in time once monitoring that there exists the abnormal charging, thereby effectively improving the safety and intelligence of the terminal.

What is claimed is:

1. A method for charging, applied to a terminal, comprising:
    detecting a battery to obtain a battery charging parameter after turning on a fast charging function;
    determining whether an abnormal charging occurs according to the battery charging parameter;
    turning off the fast charging function in response to determining that the abnormal charging occurs;
    sending a disconnection instruction to an adapter in response to determining that the abnormal charging occurs;
    receiving a disconnection response for responding to the disconnection instruction from the adapter; and
    disconnecting a connection with the adapter according to the disconnection response.

2. The method according to claim 1, wherein detecting the battery to obtain the battery charging parameter comprises:
    detecting a voltage of the battery at a first preset time interval to obtain a voltage variation parameter; and
    determining the voltage variation parameter as the battery charging parameter.

3. The method according to claim 1, wherein detecting the battery to obtain the battery charging parameter comprises:
    detecting an electric quantity of the battery at a second preset time interval to obtain an electric quantity variation parameter; and
    determining the electric quantity variation parameter as the battery charging parameter.

4. The method according to claim 1, wherein detecting the battery to obtain the battery charging parameter comprises:
    detecting a current of the battery in real time to obtain a real-time battery current; and determining the real-time battery current as the battery charging parameter.

5. The method according to claim 4, wherein determining whether the abnormal charging occurs according to the battery charging parameter comprises:
    determining that the abnormal charging occurs based on a determination that the real-time battery current is negative; and
    determining that the abnormal charging does not occur based on a determination that the real-time battery current is not negative.

6. The method according to claim 2, wherein determining whether the abnormal charging occurs according to the battery charging parameter comprises:
   determining that the abnormal charging occurs based on a determination that the voltage variation parameter does not satisfy a preset parameter variation strategy; and
   determining that the abnormal charging does not occur based on a determination that the voltage variation parameter satisfies the preset parameter variation strategy.

7. A terminal, comprising:
   a processor; and
   a memory, configured to store instructions executable by the processor,
   wherein the processor is configured to run a program corresponding to the instructions by reading the instruction stored in the memory, so as to:
      detect a battery to obtain a battery charging parameter after turning on a fast charging function;
      determine whether an abnormal charging occurs according to the battery charging parameter;
      turn off the fast charging function in response to determining that the abnormal charging occurs;
      send a disconnection instruction to an adapter in response to determining that the abnormal charging occurs;
      receive a disconnection response for responding to the disconnection instruction from the adapter; and
      disconnect a connection with the adapter according to the disconnection response.

8. The terminal according to claim 7, wherein the processor is configured to:
   detect a voltage of the battery at a first preset time interval to obtain a voltage variation parameter, and determine the voltage variation parameter as the battery charging parameter;
   detect an electric quantity of the battery at a second preset time interval to obtain an electric quantity variation parameter, and determine the electric quantity variation parameter as the battery charging parameter; and
   detect a current of the battery in real time to obtain a real-time battery current, and determine the real-time battery current as the battery charging parameter.

9. The terminal according to claim 8, wherein the processor is configured to:
   determine that the abnormal charging occurs, based on a determination that the real-time battery current is negative; and
   determine that the abnormal charging does not occur, based on a determination that the real-time battery current is not negative.

10. The terminal according to claim 9, wherein the processor is configured to:
    determine that the abnormal charging occurs based on a determination that any of the voltage variation parameter and the electric quantity variation parameter does not satisfy a preset parameter variation strategy; and
    determine that the abnormal charging does not occur based on a determination that both the electric quantity variation parameter and the voltage variation parameter satisfy the preset parameter variation strategy.

11. A non-transitory computer readable storage medium, having a program stored thereon, and applied to a terminal, wherein when the program is executed by a processor, a charging method is implemented, a charging method is implemented, the charging method comprising:
    detecting a battery to obtain a battery charging parameter after turning on a fast charging function;
    determining whether an abnormal charging occurs according to the battery charging parameter;
    turning off the fast charging function in response to determining that the abnormal charging occurs;
    sending a disconnection instruction to an adapter in response to determining that the abnormal charging occurs;
    receiving a disconnection response for responding to the disconnection instruction from the adapter; and
    disconnecting a connection with the adapter according to the disconnection response.

12. The method according to claim 3, wherein determining whether the abnormal charging occurs according to the battery charging parameter comprises:
    determining that the abnormal charging occurs based on a determination that the electric quantity variation parameter does not satisfy a preset parameter variation strategy; and
    determining that the abnormal charging does not occur based on a determination that the electric quantity variation parameter satisfies the preset parameter variation strategy.

13. The method according to claim 4, wherein a current flowing out of the battery is defined to be negative, and a current flowing into the battery is defined to be positive.

14. The terminal according to claim 8, wherein the first preset time interval is greater than or equal to the second preset time interval.

15. The terminal according to claim 9, wherein a current flowing out of the battery is defined to be negative, and a current flowing into the battery is defined to be positive.

* * * * *